(12) United States Patent
Roh

(10) Patent No.: US 7,457,016 B2
(45) Date of Patent: Nov. 25, 2008

(54) OPTICAL SYSTEM FOR PROCESSING CD, DVD AND HOLOGRAPHIC DIGITAL DATA

(75) Inventor: Jae-Woo Roh, Seoul (KR)

(73) Assignee: Daewoo Electronics Corp., Seoul (KR)

( * ) Notice: Subject to any disclaimer, the term of this patent is extended or adjusted under 35 U.S.C. 154(b) by 129 days.

(21) Appl. No.: 11/159,292

(22) Filed: Jun. 23, 2005

(65) Prior Publication Data
US 2005/0270957 A1 Dec. 8, 2005

Related U.S. Application Data

(63) Continuation-in-part of application No. 09/796,637, filed on Mar. 2, 2001, now abandoned.

(30) Foreign Application Priority Data
Nov. 1, 2000 (KR) ................................ 2000-64657

(51) Int. Cl.
*G02B 5/32* (2006.01)
*G11B 7/00* (2006.01)
(52) U.S. Cl. ..................... 359/15; 369/103; 369/110.01
(58) Field of Classification Search .................. 359/15; 369/112.01, 112.16, 112.17, 112.18, 112.19, 369/124, 125, 103, 110.01, 110.02, 112
See application file for complete search history.

(56) References Cited

U.S. PATENT DOCUMENTS

| 3,720,453 | A | * | 3/1973 | Lee et al. ........................ 359/5 |
| 5,550,779 | A | * | 8/1996 | Burr et al. .................... 365/216 |
| 5,748,602 | A | * | 5/1998 | Chao et al. ............. 369/112.17 |
| 6,288,986 | B1 | * | 9/2001 | McDonald et al. ....... 369/44.23 |

* cited by examiner

*Primary Examiner*—Audrey Y Chang
(74) *Attorney, Agent, or Firm*—Bacon & Thomas, PLLC

(57) ABSTRACT

An optical system capable of selectively processing CD, DVD and holographic digital data is provided. The system includes a beam generation unit providing a linearly polarized light beam; a beam splitter for respectively reflecting and transmitting a first and a second linearly polarized light beam component; an optical sensor; a first beam path through which the first linearly polarized light beam component propagates to serve as a reference beam for the holographic digital data; and a second beam path for accepting the second linearly polarized light beam component, the second light beam component serving as a beam source for reproducing the CD and DVD digital data, wherein a beam carrying digital data reproduced from any one of CD, DVD and holographic storage medium propagates along the second beam path and is reflected by the beam splitter toward the optical sensor.

8 Claims, 8 Drawing Sheets

OPTICAL SYSTEM FOR PROCESSING CD, DVD AND HOLOGRAPHIC DIGITAL DATA

CROSS REFERENCE TO RELATED APPLICATION

This application is a continuation-in-part application of U.S. application Ser. No. 09/796,637 filed on Mar. 2, 2001 now abandoned.

FIELD OF THE INVENTION

The present invention relates to an optical system capable of selectively processing CD, DVD and holographic digital data; and, more particularly, to an optical system capable of selectively recording and reproducing digital data on and from a CD, a DVD and a holographic storage medium.

BACKGROUND OF THE INVENTION

Recently, there are reported increasing levels of active researches on holographic digital data storage systems as semiconductor lasers, charge coupled devices (CCDs), liquid crystal displays (LCDs) and the like are being developed. Since the holographic digital data storage system normally features a large storage capacity and high data transfer rate, it has already been applied to, e.g., fingerprint recognition systems for storing and reproducing fingerprints, and the scope of its applications keeps expanding.

The holographic digital data storage system allows a signal beam transmitted from an object to interfere with a reference beam, and writes an interference pattern generated from such interference phenomena on a storage medium such as a crystal or a photopolymer which reacts differently depending on an amplitude or phase of the interference pattern. In the holographic digital data storage system, the phase of the signal beam as well as the amplitude thereof may be recorded by changing an incidence angle of the reference beam, so that a three dimensional display of an object can be realized. Further, hundreds to thousands of hologram digital data constituted with binary data on a page-by-page basis can be stored in a single space of the storage medium.

FIG. 1 depicts an overall block diagram of a holographic digital data storage system, wherein the holographic digital data storage system includes a light source 20, a beam expander 21, a beam splitter 22, two reflection mirrors 23 and 24, a spatial light modulator (SLM) 25, a storage medium 26 and a CCD 27.

The light source 20 generates a light beam, e.g., a laser beam, whose wavelength falls within a specific wavelength band required for the holographic digital data. The beam expander 21 expands the size of the laser beam.

The beam splitter 22 separates the expanded laser beam into a reference beam and a signal beam and transfers the reference beam and the signal beam through two different transmission channels, wherein the reference beam and the signal beam correspond to a transmitted beam and a reflected beam, respectively.

The reference beam is reflected by the reflection mirror 24 so that the reflected reference beam is transferred to the medium 26. The signal beam, on the other hand, is reflected by the reflection mirror 23 so that the reflected signal beam is transferred to the SLM 25. The SLM 25 modulates the reflected signal beam into binary pixel data on a page basis. The modulated signal beam is transferred to the medium 26. In case the reflected signal beam is, for example, image data provided on a frame basis, the reflected signal beam is preferably modulated on a frame basis and the reflection mirror 24 functions to change the reflection angle of the reflected reference beam by a small amount according to each frame of the reflected signal beam.

The medium 26 stores the interference pattern acquired from an interference phenomenon between the reflected reference beam and the modulated signal beam, wherein the interference pattern depends on the reflected signal beam, i.e., the data inputted to the SLM 25. In other words, the modulated signal beam irradiated to the medium 26 has been modulated on a page basis and the reflected reference beam has been reflected in an angle corresponding to each page of the modulated signal beam. The modulated signal beam interferes with the reflected reference beam within the medium 26. The amplitude and phase of the interference pattern results in a photo-induction within the medium 26 so that the interference pattern may be written on the medium 26.

When only the reference beam is irradiated onto the medium 26 in order to reconstruct the data written thereon, the reference beam is diffracted by the interference pattern within the medium 26, so that a check pattern reflecting original brightness on a pixel basis may be restored. When the check pattern is irradiated on the CCD 27 in turn, the original data may be restored. The reference beam used for reproducing the data written on the medium 26 should be irradiated at the same incidence angle as that of the reference beam when recording the data on the medium 26.

FIG. 2 presents a block diagram of a conventional CD or DVD player, wherein the CD/DVD player includes a high frequency overlap module 10, two mirrors 11 and 18, a polarizing prism 12, a cylindrical lens 13, an photodiode (PD) 14, a λ/4 plate 15, a disc medium 16, an object lens 17 and a collimating lens 19. A detailed description for the structure and the operational principle of such CD/DVD player will be omitted here since it is well known to a person having ordinary skill in the relevant art.

As for the conventional CD/DVD player of FIG. 2 and the conventional holographic digital data storage system of FIG. 1, however, there has been found a drawback in that they cannot be compatible with each other since the positions of their detectors, e.g. optical diodes, are different from each other. To be specific, since the CD/DVD player has its detector at a direction of reflection while the holographic digital data storage system has its detector at a transmission direction, a single detector cannot be used for both systems. Further, the size difference of beams used in the two systems is so great that two different optical instruments are required.

SUMMARY OF THE INVENTION

It is, therefore, a primary object of the present invention to provide an optical system capable of selectively recording and reproducing digital data on and from a CD, a DVD and a holographic storage medium by changing optical channels and beam sizes through the use of a spatial light modulator (SLM) such as a micro-mirror array or a transmissive liquid crystal display (transmissive LCD) and the like.

In accordance with a first preferred embodiment of the present invention, there is provided an optical system capable of selectively processing CD, DVD and holographic digital data, comprising: a beam generation unit providing a linearly polarized light beam; a beam splitter for respectively reflecting and transmitting a first and a second linearly polarized light beam component from the beam generation unit, the first and the second linearly polarized light beam component being orthogonal to each other; an optical sensor; a first beam path through which the first linearly polarized light beam component reflected by the beam splitter propagates to serve as a reference beam for the holographic digital data; and a second beam path for accepting the second linearly polarized light beam component transmitted through the beam splitter, the second light beam component serving as a beam source for reproducing the CD and DVD digital data, wherein a beam carrying digital data reproduced from any one of CD, DVD and holographic storage medium propagates along the second beam path and is reflected by the beam splitter toward the optical sensor.

BRIEF DESCRIPTION OF THE DRAWINGS

The above and other objects and features of the present invention will become apparent from the following description of preferred embodiments given with conjunction with the accompanying drawings, in which.

DETAILED DESCRIPTION OF THE INVENTION

Figure 1:
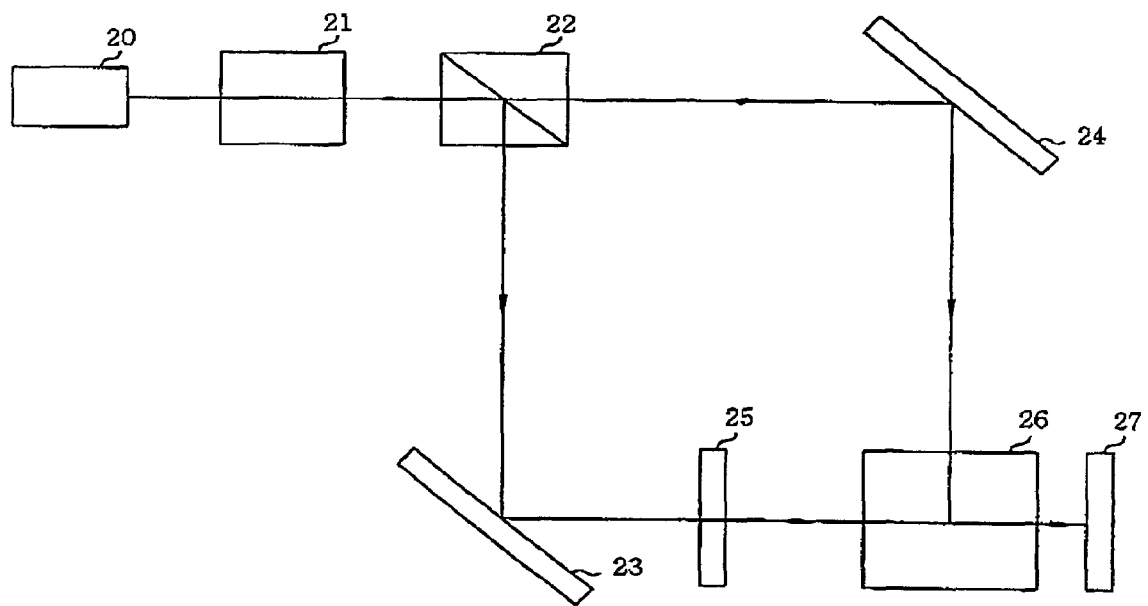
FIG. 1 is a block diagram of a conventional holographic digital data storage system.
Figure 2:
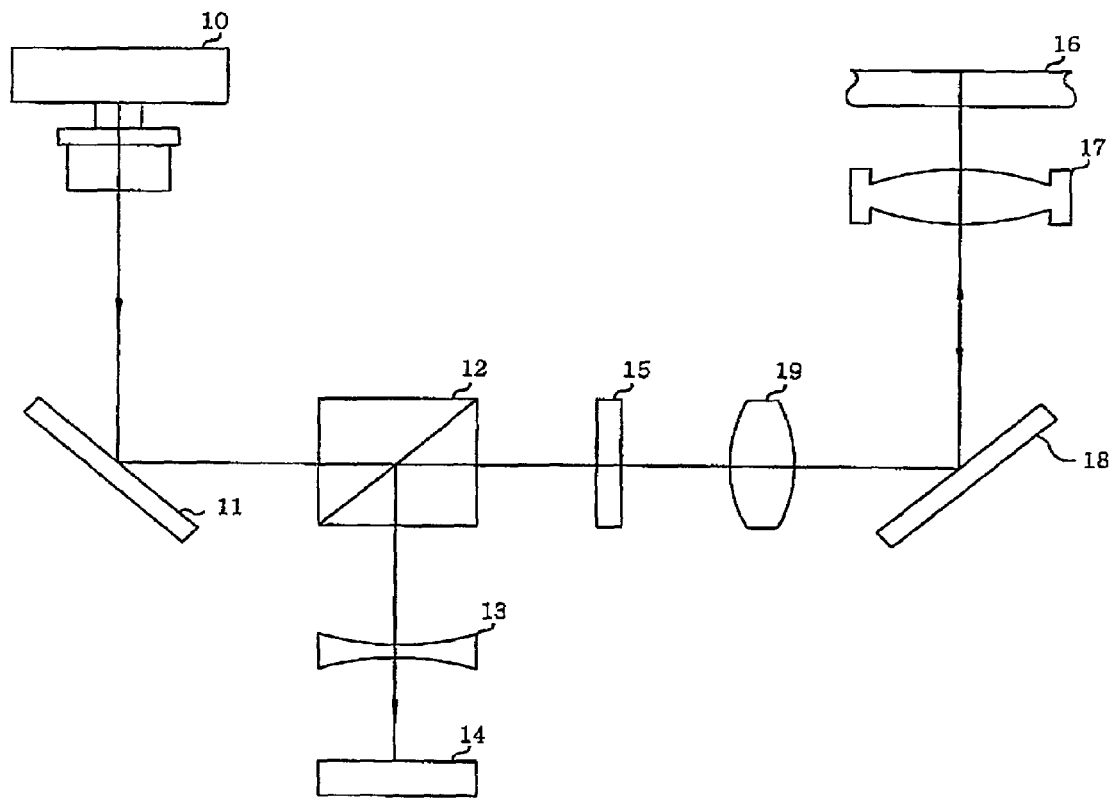
FIG. 2 depicts a block diagram of a conventional CD/DVD player.
Figure 3:
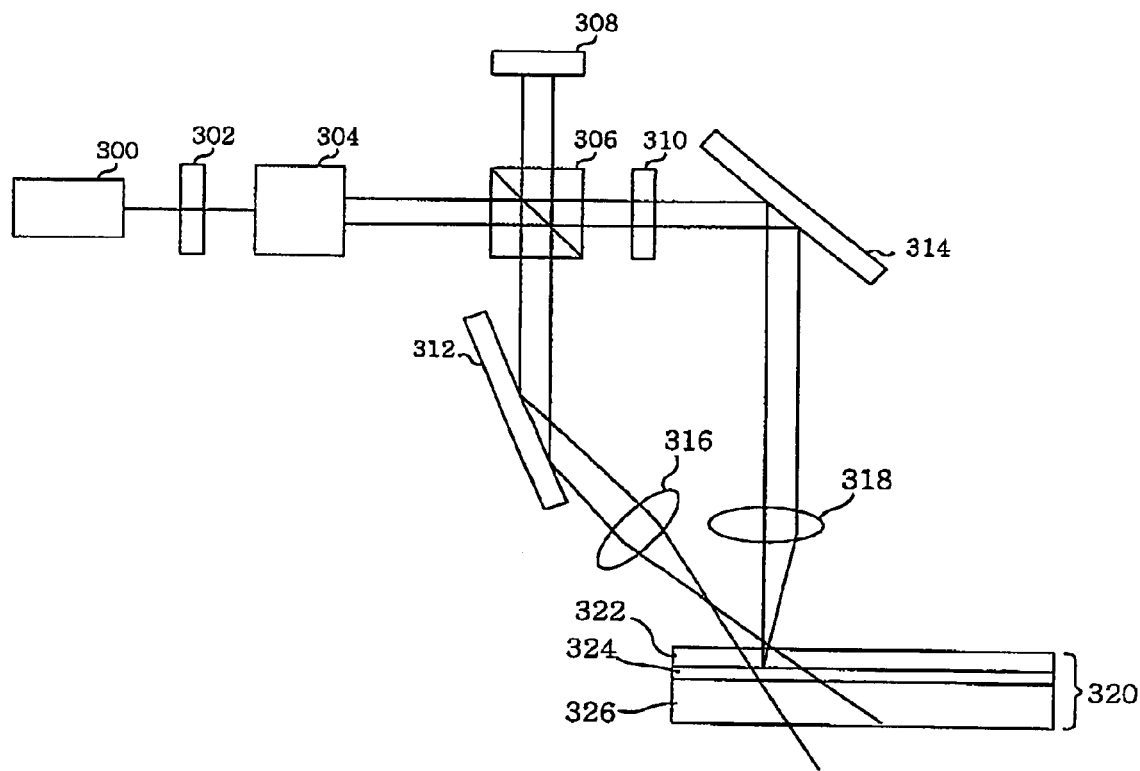
FIG. 3 presents a block diagram of an optical system capable of selectively processing CD, DVD and holographic digital data in accordance with a first embodiment of the present invention.

FIG. 3 is a block diagram of an optical system for recording and reproducing digital data on and from a holographic, CD and DVD storage medium in accordance with a first embodiment of the present invention. The optical storage system includes a light source 300, two waveplates 302 and 310, an optical expander 304, a polarization beam splitter 306, a charge coupled device (CCD) 308, a mirror 312, a micro-mirror array 314, two lenses 316 and 318 and a storage medium 320.

The light source 300 is an essential element for the writing and reconstruction processes for the CD, DVD and holographic storage medium. A laser, for example, can be used as the light source. The light source 300 provides a light beam with an optimum wavelength or wavelength band for the medium 320 which can be a CD disc, a DVD disk or a holographic digital data storage disc in accordance with the present invention. The light source 300 provides, e.g., a horizontally (S) polarized laser beam of 532 nm.

The waveplates 302 and 310 are installed between the light source 300 and the optical expander 304 and between the polarization beam splitter 306 and the micro-mirror array 314, respectively, to rotate a polarization angle of an incident laser beam by a predetermined degree. Herein, the waveplates 302 and 310 are half-waveplates. As well known in the art, the half-waveplate can be used to rotate the plane of polarization of a plane-polarized light. When a plane-polarized wave is normally incident on the half-waveplate, and the plane of polarization of the incident wave is at an angle $\theta$ with respect to the fast (or slow) axis, the plane wave will be rotated through an angle $2\theta$. Therefore, the half-waveplate can be used in rotating the plane of polarization from a polarized laser to any other desired plane.

The optical expander 304 expands the beam size of the incident laser beam to generate an expanded beam. The polarization splitter 306 splits the expanded beam into a vertically (P) polarized beam reflected toward the mirror 312 and a horizontally (S) polarized beam transmitted toward the $\lambda/2$ plate 310.

The mirror 312 reflects the P-polarized beam to the lens 316. The micro-mirror array 314 including a number of mirror pixels can reflect the incident S-polarized beam into various directions by selectively controlling each of the mirror pixels. The micro-mirror array 314 in accordance with the present invention may be used to adjust a numerical aperture of the laser beam when the optical system is in the CD/DVD mode and also be used as a spatial light modulator (SLM) when the optical system is in the holographic mode.

The two lenses 316 and 318 are used to focus the laser beams reflected from the mirror 312 and the micro-mirror array 314, respectively.

The medium 320 for the holographic mode in accordance with the present invention is configured to have a mirror coating 324 provided on a substrate 326 and coated a holographic digital data storage material 322 on the mirror coating 324. In other words, medium 320 for the holographic mode has a similar structure to the CD and DVD disc.

Figure 4:
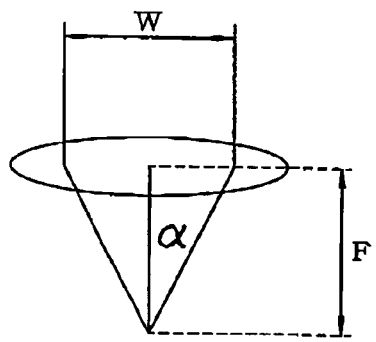
FIG. 4 describes a principle of compatibility of the optical system shown in FIG. 3.

FIG. 4 describes a principle of compatibility between the CD, DVD and holographic modes which can be carried out by the optical system in accordance with the present embodiment. It is assumed that the beam is irradiated through the lens with a focal length F at a predetermined angle $\alpha$. In the CD and DVD modes, beam factors $B_F$ thereof should be maintained constant, respectively. In general, $B_F$ of the CD player is $0.5769\ \mu m^{-1}$ and the $B_F$ of the DVD player is $0.9230\ \mu m^{-1}$. The $B_F$ can be calculated as follows:

$$B_F = \frac{N \cdot A}{\lambda}, \quad \text{Eq. 1}$$

wherein $\lambda$ and N.A. represent a wavelength of the beam and a numerical aperture, respectively. When different wavelength is used, the N.A. is controlled in such a way that the $B_F$ remains constant and thus the CD/DVD player can be played.

The N.A. is calculated as follows:

$$N.A = n \cdot \sin \alpha \quad \text{Eq. 2}$$

wherein n represents a refractive index of a material after a beam passes through the lens and $\alpha$ represents a focus angle against an optical axis, i.e., a central axis, of the lens In other words, $\sin \alpha$ is a function of the focal length F of the lens and a beam width W of the beam incident into the lens given as follows:

$$\sin\alpha = \frac{W}{2\sqrt{\left(\frac{W}{2}\right)^2 + F^2}}. \qquad \text{Eq. 3}$$

Accordingly, the beam width W can be derived from an equation as follows:

$$W = \frac{2FB_F\lambda}{n} \cdot \frac{1}{\sqrt{1-\left(\frac{B_F\lambda}{n}\right)^2}}. \qquad \text{Eq. 4}$$

Consequently, the $B_F$ can be sustained at a constant value by controlling the beam width W and thereby adjusting the N.A., so that the CD/DVD player can be played.

When an Nd-YAG laser beam having a wavelength λ of 532 nm is transmitted through the air whose refractive index is 1 and a lens with a focal length F of 1 cm is employed, a beam factor $B_{FCD}$ for the CD player and a beam factor $B_{FDVD}$ for the DVD player are 0.5769 μm$^{-1}$ and 0.9230 μm$^{-1}$, respectively. Accordingly, the beam widths $W_{CD}$ and $W_{DVD}$ required in the CD and DVD mode are calculated as follows respectively:

$$W_{CD} = \frac{2(1\text{ cm})(0.5769\ \mu\text{m}^{-1})(0.532\ \mu\text{m})}{\sqrt{1-(0.5769\ \mu\text{m}^{-1})^2(0.532\ \mu\text{m})^2}} = 0.64495 \text{ cm} \qquad \text{Eq. 5}$$

$$W_{DVD} = \frac{2(1\text{ cm})(0.9230\ \mu\text{m}^{-1})(0.532\ \mu\text{m})}{\sqrt{1-(0.9230\ \mu\text{m}^{-1})^2(0.532\ \mu\text{m})^2}} = 1.12734 \text{ cm} \qquad \text{Eq. 6}$$

The beam width $W_{CD}/W_{DVD}$ can be adjusted by controlling an on/off operation of each mirror pixel of the micro-mirror array 314. When the system is used in a CD or DVD mode, only a predetermined range of beam (i.e., with a beam width $W_{cd}$ or $W_{dvd}$) proceeds to the medium 320 by controlling all the mirror pixels in the micro-mirror array 314.

Figure 5A:
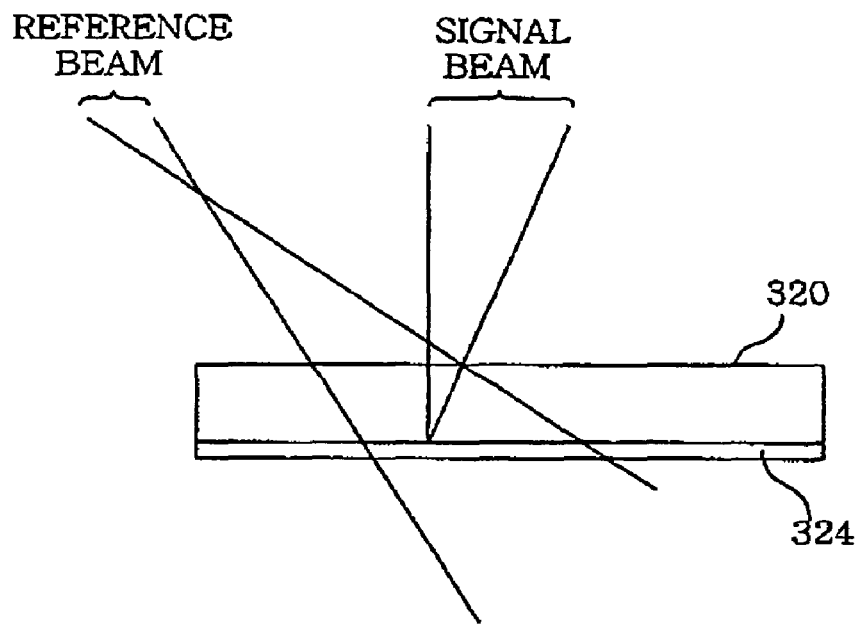
FIGS. 5A to 5B demonstrate a writing/reconstruction principle of an optical system shown in FIG. 3.
Figure 5B:
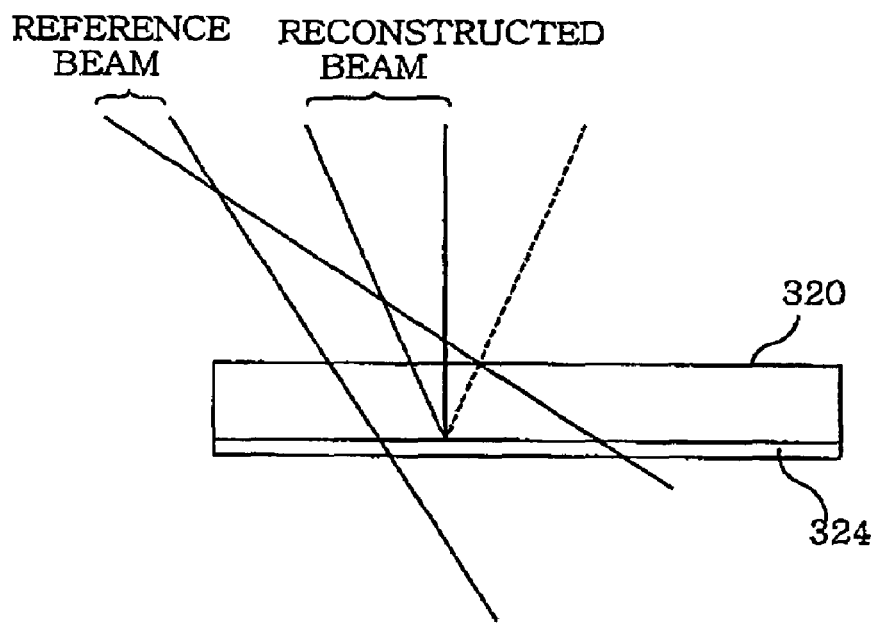

FIGS. 5A and 5B illustrate a writing/reconstruction principle when the optical system is in the holographic mode in accordance with the present embodiment. In the holographic operational mode, the holographic digital data is recorded in a writing operation by using the interference between the reference beam and the signal beam. Herein, the signal beam should enter the lens through a predetermined portion of the lens in such a manner that the incident beam does not interfere with the reflected beam reflected from a surface of the mirror coating 324. Otherwise, the interference results in a noise.

A reconstructed signal beam in a reconstruction operation of the holographic mode proceeds along the direction of the original signal beam. Then, the reconstructed signal beam is reflected by the mirror coating 324 Accordingly, the reconstructed beam outputted in the reproduction operation is a substantial reflection of the signal beam inputted in the writing mode.

The followings are detailed description of the operational principle of the optical system operating in the writing operation of the holographic mode in accordance with the present embodiment.

The rotation angle of the λ/2plate 302 (i.e., the angle between the plane of polarization of the plane-polarized beam and the fast axis of the λ/2plate 302) changes the polarization direction of a laser beam outputted from a light source 300 to generate a polarization-rotated beam after the laser beam passes through the λ/2plate 302. The above polarization-rotated beam is composed of a vertically (P) polarized beam component and a horizontally (S) polarized beam component, wherein the intensities of the reference and the signal beam depend on the ratio of the P- and the S-polarized beam. Supposing that the laser beam outputted from the light source 302 is a S-polarized beam, if the angle between the plane of polarization of the incident laser beam and the fast axis of the λ/2plate 302 is π/8, the intensity of the reference beam is equal to that of the signal beam. The beam expander 304 expands the polarization-rotated beam and then the polarization splitter 306 divides the expanded polarization-rotated beam into the P-polarized beam and the S-polarized beam. In the present invention, it is assumed for illustration that the S-polarized beam component is transmitted through the polarization splitter 306 and the P-polarized beam component is reflected at the polarization splitter 306 (a polarization splitter having the reverse constitution may also exist).

Figure 6A:
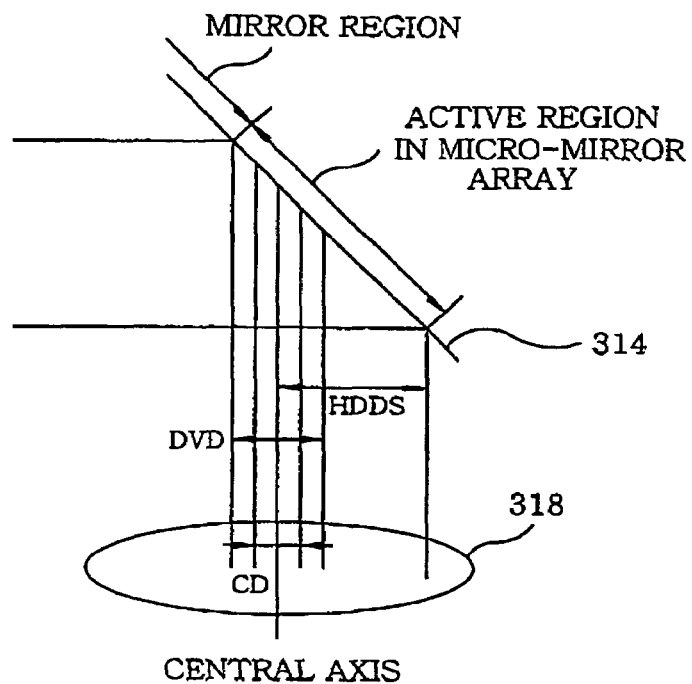
FIG. 6A explains an operational principle of a micro-mirror array shown in FIG. 3 and an optical path thereby.

In this embodiment, the waveplate 310 is a λ/2plate and the angle between the plane of polarization of the laser beam incident upon the λ/2plate 310 (i.e., the transmitted S-polarized beam) and the fast axis of the λ/2plate 310 is π/4. Therefore, the transmitted S-polarized beam passes through the λ/2plate 310 and becomes a P-polarized beam. The P-polarized beam from λ/2plate 310 subjects to the micro-mirror array 314 such as a TMA (thin-film micro-mirror array). Specifically, by controlling the mirror pixels in the holographic mode, the incident beam thereto may be modulated into a modulated signal beam that corresponds to the required signal. The modulated signal beam is irradiated into the medium 320 through the lens 318. FIG. 6A demonstrates an operational principle of the micro-mirror array 314 and an optical channel of the beam. With the central axis of the lens 318 being a datum, all pixels within a half plane (e.g., a left half plane in FIG. 6A) of the micro-mirror array 314 goes off. That is, the pixels in the left half plane of the micro-mirror array 314 do not reflect the incident beam thereto toward the mirror 318. In the meantime, pixels in another half plane (e.g., a right half plane in FIG. 6A) of the micro-mirror array 314 goes on and off to provide a modulated signal beam. That is, according to the required signal, some of the pixels in the right half plane reflect light toward the lens 318, and the others don't.

Figure 6B:
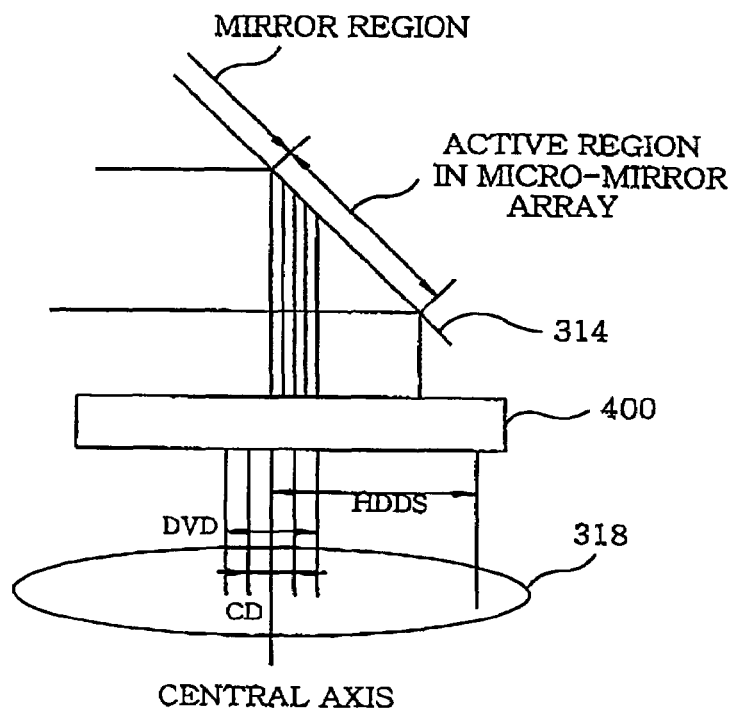
FIG. 6B shows an operational principle of a micro-mirror array in the case of using the optical expander shown in FIG. 3 and an optical path thereby.

An optical expander 400 may be added between the micro-mirror array 314 and the lens 318 in order to obtain a higher resolution and to store more data. FIG. 6B describes an operational principle of the micro-mirror array 314 and the optical path thereby in case the optical expander 400 is used. When the optical expander 400 is utilized, however, a distortion by an aberration and the like can be generated as the modulated signal beam reaches farther from the optical axis of the lens 318.

The P-polarized beam from the polarization splitter 306, which is a reference beam, is reflected by the mirror 312 and irradiated into the medium 320 through lens 316. In the above step, when a shift multiplexing method, as shown in FIG. 3, is used, the lens may be adjusted so that the vertically polarized beam is focused before the storage medium 320 and then illuminated to the medium 320 as the reference beam. In case another multiplexing method is adopted, an adequate module therefor should be added. For example, in case an angular multiplexing method is utilized, a unit such as a Galvano mirror may be preferably added.

As described above, data can be written on a holographic digital data storage material 322 by using the interference between the reference beam and the signal beam.

In the reconstruction operation, a S-polarized beam is generated by the light source 300. Then, the S-polarized beam is sent toward the λ/2plate 302. In the reconstruction operation, the rotation angle of the λ/2plate 302 (i.e., the angle between the plane of polarization of the plane-polarized beam and the fast axis of the waveplate 302) is π/4. Accordingly, the S-polarized beam is changed into a P-polarized beam after passing the λ/2plate 302. Then, the beam outputted from the λ/2plate 302 is expanded by the optical expander 304. The expanded P-polarized beam is reflected by the polarization splitter 306 toward the mirror 312. Consequently, the P-polarized beam is irradiated onto the storage medium 320 via lens 316. By irradiating only the reference beam onto the medium 320, the signal beam is reconstructed from the holographic digital data storage material 322; and the reconstructed signal beam is reflected by the mirror coating 324. The reflected reconstructed beam passes through the lens 318. The region of the lens 318 where the reconstructed beam passes through is a region of the lens 318 which had not been used in the writing operation. The reconstructed beam passes through the lens 318 and then proceeds to the micro-mirror array 314. In the reconstruction mode, the micro-mirror array 314 functions as a mirror having a single reflective plane. After the direction of the reconstructed beam is changed at the micro-mirror array 314, the reconstructed beam proceeds to the λ/2plate 310. In the reconstruction operation, the λ/2plate 310 is adjusted such that an angle between the plane of polarization of the reconstructed beam incident upon the λ/2plate 310 (, which is a P-polarized beam,) and the fast axis of the λ/2plate 310 is 0 degree. Accordingly, the λ/2plate 310 adjusts the polarization direction of the reconstructed beam such that the reconstructed beam should be reflected at the polarization splitter 306. That is, the reconstructed beam remains as the P-polarized beam after passing through the λ/2plate 310. Then, the reflected reconstructed beam is sent to the CCD 308.

When the optical system is operated in the CD or the DVD mode, the λ/2plate 302 may be preferably adjusted in such a way that only the S-polarized beam (the component which transmits the polarization splitter 306) exists at the output of the λ/2plate 302. That is, supposing that the laser beam outputted from the light source 300 is the S-polarized beam, the λ/2plate 302 is modulated to make an angle between a plane of polarization of the laser beam outputted from the light source 302 and the fast axis of the λ/2plate 302 to be 0. The S-polarized beam outputted from 302 is expanded by the beam expander 304 and the expanded beam is totally transmitted to the λ/2plate 310 through the polarization splitter 306. At this time, the λ/2plate 310 is modulated to make an angle between a plane of polarization of the transmitted beam and the fast axis of the λ/2plate 310 be π/8. Accordingly, the beam which is transmitted through the polarization beam splitter 306 is controlled so that the plane of polarization of the transmitted beam rotates by as much as π/4 by the second plate 310. The beam is modulated by the micro-mirror array 314 so as to have a beam size adequate for the CD or DVD player. Afterwards, the beam passes through the lens 318 and is irradiated onto the medium 320 on which data are recorded in the CD or DVD format, thereby generating the reflected beam.

After the beam irradiated on the medium 320 is reflected, the reflected beam subsequently passes through the lens 318 and the micro-mirror array 314. Then the plane of polarization of the reflected beam is rotated by as much as π/4 by the λ/2plate 310. Accordingly, the reflected beam becomes a P-polarized beam, now. This beam is reflected by the polarization beam splitter 306 and finally sent to the CCD 308.

The CD/DVD player can be implemented in the holographic digital data storage system by configuring the structure as cited above and by following the above-described operation.

Figure 7:
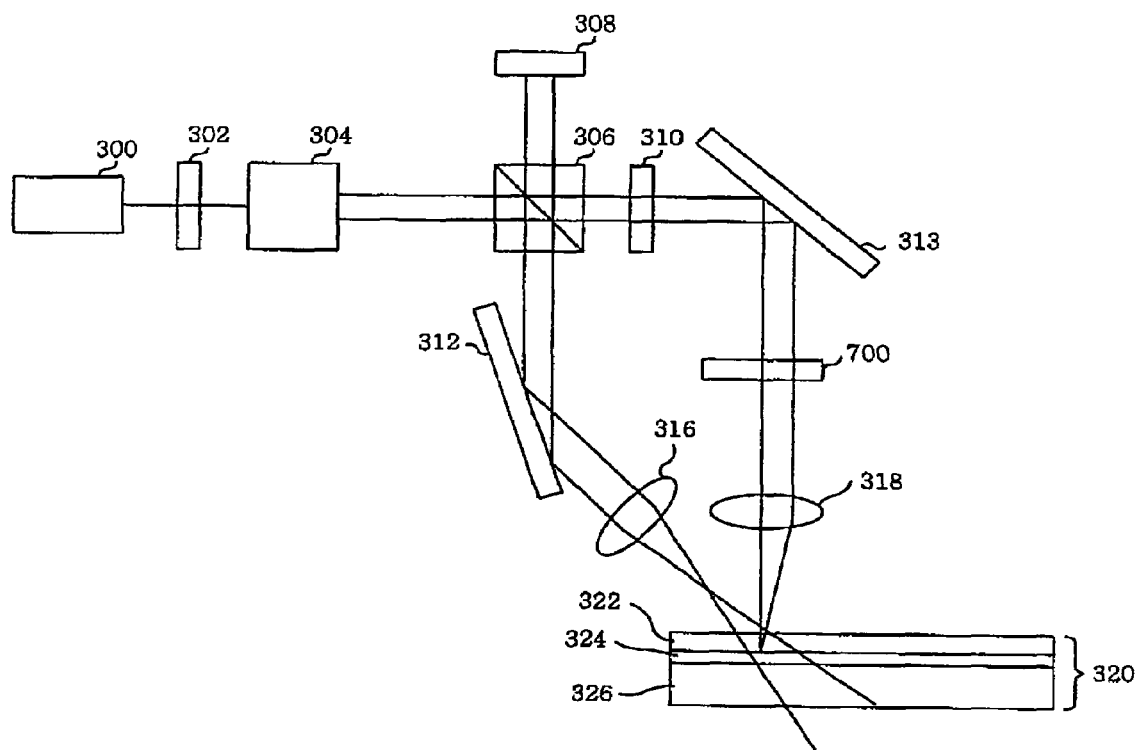
FIG. 7 sets forth a block diagram of an optical system capable of selectively processing CD, DVD and holographic digital data in accordance with another embodiment of the present invention.

FIG. 7 depicts a block diagram of an optical system for recording and reproducing digital data on and from a holographic, CD and DVD storage medium in accordance with a second embodiment of the present invention. The optical system includes a mirror 313 and a transmissive type SLM 700 such as a transmissive type LCD instead of the micro-mirror array 314 of FIG. 3.

The beam width can be adjusted by an on-off operation of the transmissive type SLM 700, and the structure and operational method of the optical system in FIG. 7 is the same as that illustrated in FIG. 3 except the transmissive type SLM 700 and the mirror 313.

Figure 8A:
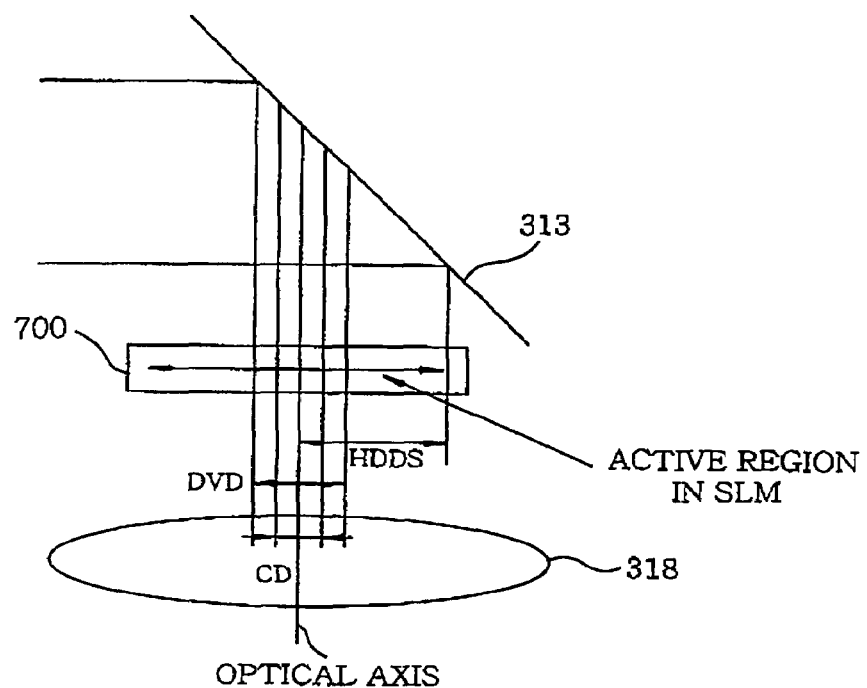
FIG. 8A describes an optical path through a spatial light modulator (SLM) shown in FIG. 7.

FIG. 8A describes an optical path of the optical system with the transmissive type SLM 700 such as the transmissive type LCD. An active region of the transmissive type SLM 700, a dashed portion in FIG. 8A, is adjusted so that the optical system of the present invention can record and reproduce digital data on and from a holographic, CD and DVD storage medium.

Figure 8B:
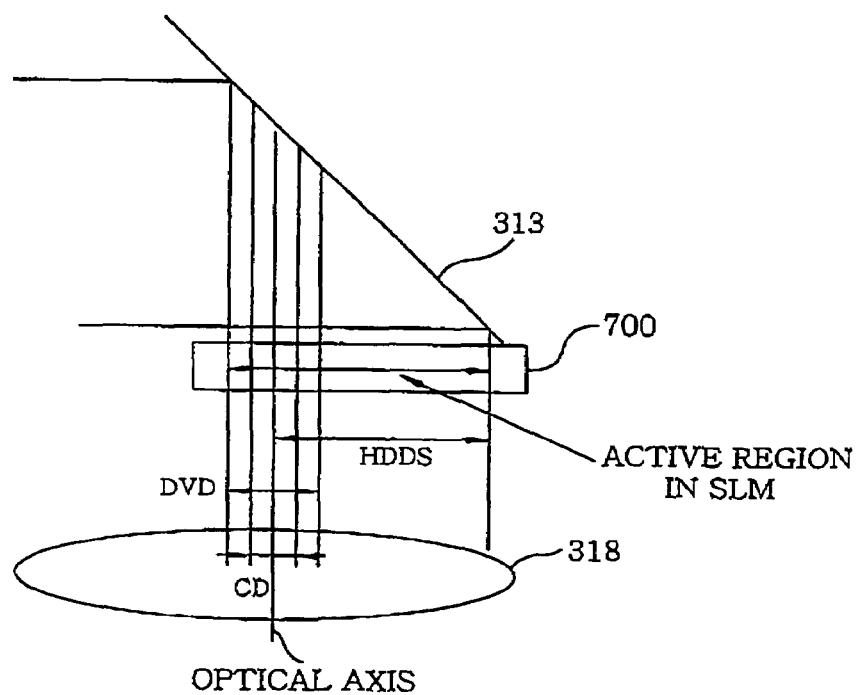
FIG. 8B describes an optical path at a time when the SLM shown in FIG. 7 is shifted.

FIG. 8B explains an optical path when the position of the transmissive type SLM 700 is changed. It is possible to enlarge input data capacity of the holographic digital data storage system by moving the transmissive type SLM 700 into a region of the holographic digital data storage system.

When the active region of the transmissive type SLM 700, a dashed portion in FIG. 8B, is dislocated from the optical path, as shown in FIG. 8B, the intensity of the reconstructed beam is more reduced than that of the reconstructed beam in the embodiment shown in FIG. 8A. In such an event, a larger volume of data may be inputted by adjusting the beam size. In FIG. 8B, it can be seen that the HDDS beam size is larger than that in FIG. 8A.

Figure 9:
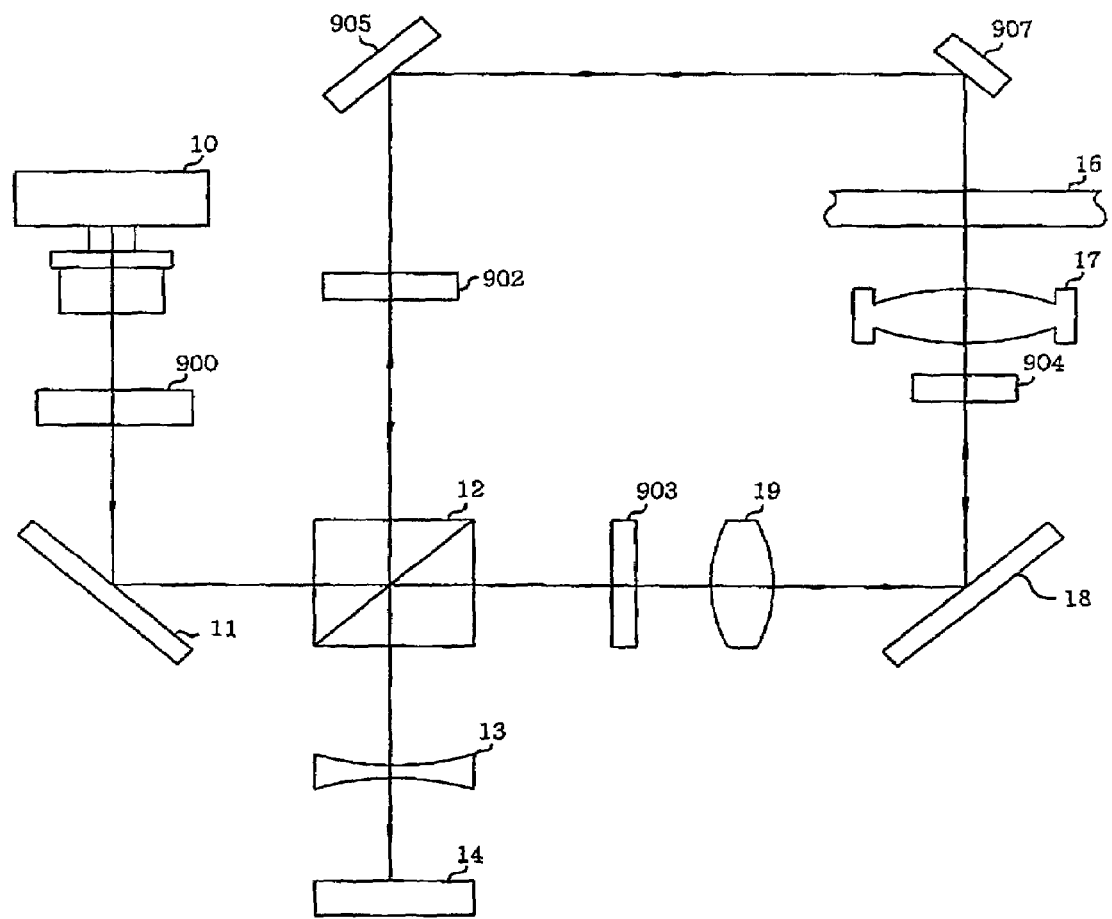
FIG. 9 provides a block diagram of an optical system capable of selectively processing CD, DVD and holographic digital data in accordance with another embodiment of the present invention.

FIG. 9 is a block diagram of an optical system capable of selectively processing CD, DVD and holographic digital data in accordance with another embodiment of the present invention. The holographic digital data storage system includes a high frequency overlap module 10, four mirrors 11, 18, 905 and 907, a polarizing prism 12, a cylindrical lens 13, a charge coupled device (CCD) 14, a disc medium 16, an object lens 17, a collimating lens 19, three λ/2plates 900, 902 and 903 and a spatial light modulator (SLM) 904.

The first λ/2plate 900, the second λ/2plate 902 and the third λ/2plate 903 are disposed at an output terminal of the high frequency overlap module 10 and a forward reflection terminal and a transmission terminal of the polarizing prism 12, respectively. The SLM 904 is located between the object lens 17 and the mirror 18. The CCD 14 is located at the backward reflection terminal of the polarizing prism 12.

In the CD or DVD mode, a numerical aperture may be adjusted by performing an on-off operation for all the pixels in the SLM 904 during the reproducing process. Further, supposing that the laser beam outputted from the high frequency overlap module 10 is a horizontally (S) polarized beam, the λ/2plate 900 is modulated to make an angle between a plane of polarization of the laser beam outputted from the high frequency overlap module 10 and the fast axis of the λ/2plate 900 be 0. Furthermore, the λ/2plate 903 is modulated to make an angle between a plane of polarization of the laser beam transmitted by the polarizing prism 12 and the fast axis of the λ/2plate 903 be π/8. By way of such a configuration, it is possible that the λ/2plate 900 may not rotate the plane of polarization of the S-polarized laser beam while the λ/2plate 903 functions similar to the λ/4plate 15 shown in FIG. 3. Specifically, the λ/2plate 903 is controlled in order that the beam reflected by the disk medium 16 should be reflected by the polarizing prism 12 to proceed to the CCD 14. This is possible because the plane of polarization of the laser beam is π/4 rotated when it passes λ/2plate 903 once; and further, the laser beam passes the λ/2plate 903 twice before it comes back to the polarizing prism 12. In a writing operation of the holographic digital data storage system, the λ/2plate 900 is modulated to make an angle between a plane of polarization of the S-polarized laser beam outputted from the high frequency overlap module 10 and the fast axis of the first half-waveplate 900 be π/8. Accordingly, the plane of polarization of the S-polarized laser beam is rotated π/4 by the λ/2plate 900, and then the beam is divided into two components by the polarizing prism 12, which are a P-polarized beam and a S-polarized beam. The subsequent writing/reconstruction mechanism is identical with the conventional method. A reconstructed beam at the time of reproducing process proceeds to the opposite direction of the reference beam used for in the writing operation. In a reconstruction operation of the optical system, supposing that the laser beam outputted from the high frequency overlap module 10 is a S-polarized beam, the λ/2plate 900 and the λ/2plate 902 are modulated to make angles between planes of polarization of the laser beams incident thereupon and the fast axes thereof be π/4 and π/8, respectively. The S-polarized laser beam becomes a P-polarized laser beam after passing the λ/2plate 900. Then, the P-polarized beam goes toward the λ/2plate 902 after being reflected by the polarizing prism 12. The plane of polarization of the reflected beam is rotated π/4 after passing the λ/2plate 902. Then, the beam is reflected by mirrors 905 and 907, respectively, and sent to the medium 16. In the medium 16, a reconstructed signal beam is generated along the direction of the original signal beam. The reconstructed signal beam is rotated π/4 again after passing the λ/2plate 902. Consequently, the reconstructed signal beam becomes a S-polarized beam. Then, the horizontally polarized beam is sent to the cylindrical lens 13 and the charge coupled device (CCD) 14, sequentially. Herein, the λ/2plate 903 may not function.

The disk medium 16 used in the optical system shown in FIG. 9 should have no reflection coating. Further, the medium 16 should be a photopolymer, not a photorefractive crystal. Since the photorefractive crystal changes refracting angle of an incident beam according to a plane of polarization, it cannot be used in the optical system shown in FIG. 9. In the meantime, the photopolymer maintains refracting angle of an incident beam irrespective of a plane of polarization of the incident beam. Therefore, the optical system of the present invention may record and reproduce digital data on and from a holographic, CD and DVD storage medium.

While the invention has been shown and described with respect to the preferred embodiments, it will be understood by those skilled in the art that various changes and modifications may be made without departing from the spirit and scope of the invention as defined in the following claims.

What is claimed is:

1. An optical system having a CD mode, a DVD mode, and the holographic mode, the optical system comprising:
    a beam generation unit providing a linearly polarized light beam including a beam source for generating the linearly polarized light beam and a first polarization angle adjusting unit for setting polarization angle of the linearly polarized light beam, wherein when the optical system performs a writing operation in the holographic mode, the linearly polarized light beam has a first and a second linearly polarized light beam component, wherein when the optical system performs a reproducing operation in the holographic mode, the linearly polarized light beam has the first linearly polarized light beam component, and wherein when the optical system is in the CD mode or the DVD mode, the linearly polarized light beam has the second linearly polarized light beam component;
    a beam splitter for respectively reflecting and transmitting the first and the second linearly polarized light beam component of the linearly polarized light beam from the beam generation unit, a polarization states of the first and the second linearly polarized light beam component being orthogonal to each other;
    an optical sensor;
    a first beam path through which the first linearly polarized light beam component reflected by the beam splitter propagates to serve as a reference beam for writing a holographic digital data to a holographic storage medium and reproducing the holographic digital data from the holographic storage medium;
    a second beam path for accepting the second linearly polarized light beam component transmitted through the beam splitter, the second light beam component serving as a signal beam for the writing operation of the holographic mode and a beam source for reproducing a CD or a DVD digital data, wherein a beam carrying digital data reproduced from CD or DVD propagates along the second beam path and is reflected by the beam splitter toward the optical sensor;
    a second polarization angle adjusting unit for adjusting a polarization angle of the second linearly polarized light component based on the mode of the optical system, the second polarization angle adjusting unit being provided on the second beam path, wherein when the optical system performs the writing operation in the holographic mode, the second polarization angle adjusting unit changes the polarization angle of the second linearly polarized light beam component by 90°; and
    an optical device for selectively adjusting a numerical aperture of the second linearly polarized light beam component in the CD mode or the DVD mode and modulating the second linearly polarized light beam component into the signal beam for the holographic digital data in the holographic mode, the optical device being provided on the second beam path.

2. The optical system of claim 1, wherein when the optical system performs the writing operation in the holographic mode, the beam generation unit provides the beam having the first and the second linearly polarized light beam component of substantially same magnitudes.

3. The optical system of claim 1, wherein when the system is in the CD mode or the DVD mode, the second polarization angle adjusting unit changes by 45° a polarization angle of a linearly polarized light beam passing therethrough.

4. The optical system of claim 1, wherein the beam generation unit further includes a beam expander for expanding a beam size of the linearly polarized light beam outputted from the first polarization angle adjusting unit.

5. The optical system of claim 1, wherein the optical device includes a micro-mirror array.

6. The optical system of claim 1, wherein the optical device includes a mirror and a transmissive type spatial light modulator.

7. The optical system of claim 1, wherein the holographic storage medium, used in the holographic mode, includes a mirror coating for reflecting the beam carrying digital data.

8. The optical system of claim 7, wherein a beam carrying digital data reproduced from holographic storage medium propagates along the second beam path after being reflected by the mirror coating of the holographic storage medium, and is reflected by the beam splitter toward the optical sensor.

* * * * *